No. 663,938. Patented Dec. 18, 1900.
C. B. SCHOENMEHL.
GALVANIC BATTERY.
(Application filed Mar. 22, 1900.)

(No Model.)

Witnesses
R. H. Newman
Edward K. Nicholson

Inventor
Charles B. Schoenmehl
By
Chamberlain & Newman
Attorneys

THE NORRIS PETERS CO., PHOTO-LITHO., WASHINGTON, D. C.

UNITED STATES PATENT OFFICE.

CHARLES B. SCHOENMEHL, OF WATERBURY, CONNECTICUT, ASSIGNOR TO THE WATERBURY BATTERY COMPANY, OF SAME PLACE.

GALVANIC BATTERY.

SPECIFICATION forming part of Letters Patent No. 663,938, dated December 18, 1900.

Application filed March 22, 1900. Serial No. 9,679. (No model.)

*To all whom it may concern:*

Be it known that I, CHARLES B. SCHOENMEHL, a citizen of the United States, and a resident of Waterbury, in the county of New Haven and State of Connecticut, have invented certain new and useful Improvements in Galvanic Batteries, of which the following is a specification.

This invention relates to closed-circuit batteries such as are used on railroads for track-circuit work.

It is the object of my invention to provide an internal resistance for the negative element of batteries of this class whereby the amperage of the current is limited, and consequently the battery is preserved and a greater length of life is insured.

With the above objects in view my invention resides and consists in the novel construction and combination of parts shown on the accompanying sheet of drawings, forming a part of this specification, upon which similar characters of reference denote like or corresponding parts throughout the several figures of the drawings, and of which—

Figure 1:
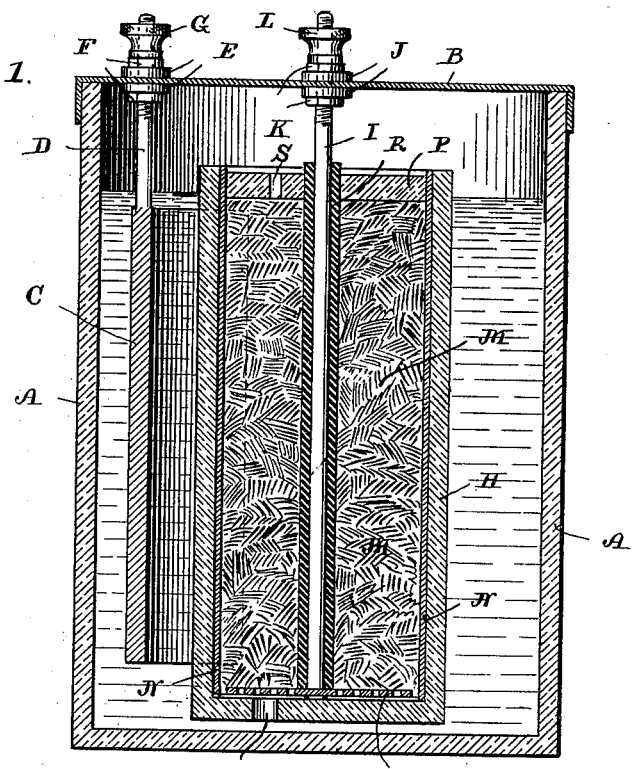
Figure 2:
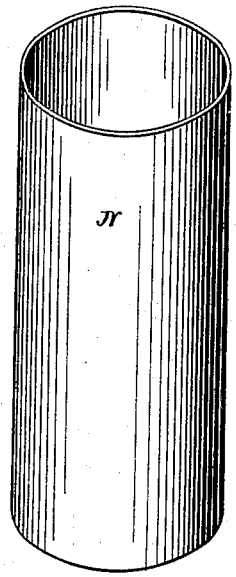
Figure 3:
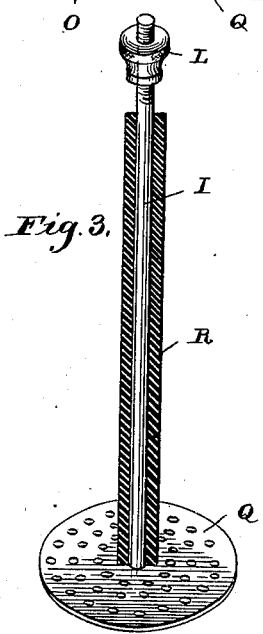
Figure 4:
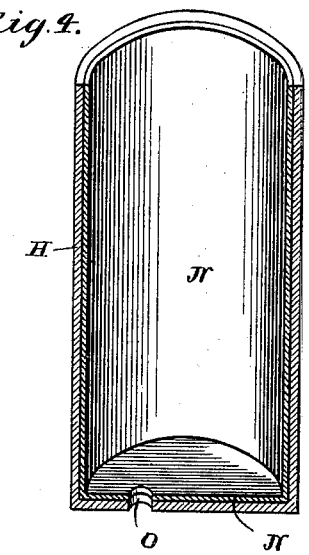

Figure 1 shows a central vertical cross-section through a battery, illustrating my invention. Fig. 2 shows a detached perspective view of a protective lining which I employ in the porous cup containing the depolarizing agent. Fig. 3 is a perspective view of the binding-post, showing its protective covering in section and the contact-plate at its bottom. Fig. 4 is a perspective sectional view of a modified form of cup and lining for the negative element.

As will be noted from the illustrations contained in my drawings, my invention in reality is confined to improvements upon the negative element of the battery; but for the sake of clearness I have shown in the drawings a battery complete, with my improvement forming a part thereof.

Referring to the characters of reference marked upon the drawings, A indicates a jar having a cover B fitted thereto, the same being preferably formed of sheet metal, as is apparent from Fig. 1. To this cover is suspended the zinc or positive element C through the medium of a wire D and insulating-washers E E and jam-nuts F F. A binding-screw G is attached to the upper end of this wire and serves to provide means for connecting the field-wire (not shown) by clamping the same down against the jam-nut F, before mentioned.

The cup H, which contains the negative element, is represented in Fig. 1 and may be of the usual stock pattern of porous cups. As will be noted, it is suspended from the cover by means of a wire I, insulatedly secured thereto by washers J J and nuts K K, and contains a binding-screw L, as shown.

In order to limit the action of the copper oxid M within the cup, I preferably provide a protective casing or coating N for the interior, thus exposing but a comparatively small area of the copper oxid for action. In Fig. 1, where I have indicated a porous cup, I have only shown the casing upon the inner side walls and omitted it at the bottom; but in Fig. 4 said casing is preferably present on the bottom as well. In both instances I provide one or more openings O to permit of the entrance of the solution through whose influence the elements may act upon each other. If, as in Fig. 4, the cup is made of a hard substance, such as glass or steel, and is lined upon both the side and bottom, the extent of the influence of the copper oxid may be governed somewhat by the size and number of openings O through the bottom. As will be noted, I not only provide a protective coating for the interior cup as against the external influences, but likewise provide a rubber or other suitable protective covering R for the binding wire and confine its contact with the copper oxid entirely through a perforated sheet-metal plate Q, attached to the bottom of the wire and located beneath the copper oxid. Said plate serves the further purpose of retaining the pole in a central position within the cup and prevents its withdrawal. The cup is properly inclosed at the top by a rubber or other suitable covering P, which contains an opening S, as shown in Fig. 1.

The protective casing which I prefer to employ within the cup is heavy paraffin paper, which I find admirably answers the purpose and makes it possible to recharge old batteries with my invention which employ the common porous cup, thus securing the improved results desired.

With the improved negative-element pole such as above described I am enabled to produce a battery the life of which for track-circuit work is increased fully one hundred per cent.

Having thus described my invention, what I claim, and desire to secure by Letters Patent, is—

1. In a negative pole for batteries of the class described the combination with a cup of an internal non-porous protective lining therefor, a depolarizing agent in said cup, an opening in the bottom of said cup, and a terminal extending into the depolarizer, substantially as described.

2. In a negative element for a battery the combination of an internal non-porous protective lining, a depolarizing agent, a cup in which said agent is located, an opening through the bottom of said cup, a central terminal post mounted in the cup and having a bare conducting-plate attached to its lower end and a protective covering for said post, substantially as shown and described.

3. In a negative element for a battery the combination of a cup having an opening through its bottom, a non-porous protective lining for the side walls of said cup, copper oxid within said cup, a central terminal post mounted in said cup and oxid, a protective casing for the sides of said terminal post and a perforated conducting-disk attached to the bottom of said post constituting the contact for the same, substantially as described.

4. The combination in a negative element for a battery of a cup provided with a perforated bottom, a non-porous lining for the interior walls of said cup, a depolarizing agent within said cup, a terminal post located in said agent and provided with a protective casing, and a perforated disk attached to the lower end of said post, substantially as described.

Signed at Bridgeport, Fairfield county, Connecticut, this 24th day of February, A. D. 1900.

CHARLES B. SCHOENMEHL.

Witnesses:
C. M. NEWMAN,
EDWARD K. NICHOLSON.